United States Patent [19]
Smith et al.

[11] Patent Number: 5,105,769
[45] Date of Patent: Apr. 21, 1992

[54] ANIMAL FEEDING DEVICE

[75] Inventors: Leslie R. Smith, Corfu; Ronald J. Folkman, Alden, both of N.Y.

[73] Assignee: K. W. Muth Company, Inc., Sheboygan, Wis.

[21] Appl. No.: 714,681

[22] Filed: Jun. 13, 1991

[51] Int. Cl.⁵ ............................................. A01K 5/01
[52] U.S. Cl. ...................................... 119/61; 119/900
[58] Field of Search ................................. 119/900, 61

[56] References Cited

U.S. PATENT DOCUMENTS

| | | | |
|---|---|---|---|
| 150,423 | 5/1874 | Link et al. | 119/900 |
| 487,003 | 11/1892 | Doolan | 119/900 |
| 1,037,093 | 8/1912 | Wendorf et al. | 119/900 |
| 1,159,190 | 11/1915 | Derr | 119/900 |
| 3,205,861 | 9/1965 | Moore | 119/61 |

Primary Examiner—John G. Weiss
Attorney, Agent, or Firm—Howard J. Greenwald

[57] ABSTRACT

An integral, lightweight, animal feeding device is disclosed. The device has a first bottom, bowl-shaped section joined to a narrower second section which, in turn, is joined to a wider third section. A tray is located at the top of the device. The tray contains a continuous flange comprised of least three substantially linear sides, one of which is longer than the other two; the longer, substantially linear side is coplanar with a portion of the bowl-shaped bottom section.

11 Claims, 3 Drawing Sheets

ANIMAL FEEDING DEVICE

FIELD OF THE INVENTION

An integral, nonmetallic animal feeding device configured to minimize feed being thrown out of the device while the animal is feeding.

BACKGROUND OF THE INVENTION

Devices for feeding animals, such as horses, are well known to the prior art.

In 1874, U.S. Pat. No. 150,423 issued to C. W. Link et al. on a horse trough. This horse trough, which was made out of cast iron, was heavy and difficult to mount. When the interior of this trough was contacted with acidic feed materials and/or moisture, it would tend to corrode and pit, thereby contaminating the feed and creating pockets in the device for bacterial growth.

The Link et al. feeder contains flanges gg partially projecting over the opening of the feeder. Although these flanges provide some protection against feed material being thrown out of the feeder from side to side, they do not provide protection in those areas of the feeder opening in which they do not appear. Furthermore, because each of flanges gg are aligned in substantially the same direction, thereby creating an oval opening, they limit the animal to feeding in only one direction.

About 90 years after the issuance of the Link et al. patent, in 1965, the problem of providing a suitable horse feeder had still not yet been solved. In that year U.S. Pat. No. 3,205,861 issued to Robert D. Moore. The Moore patent, referring to devices such as that disclosed in the Link et al. patent (which was cited during the prosecution of the Moore patent), noted that prior art horse feeders ". . . usually employed metal plates or flat rings, but these were not satisfactory because they . . . tended to cut the animal and discouraged it from eating as much as it should. The flat plates prevented adequate circulation of air around the food, so that spoilage of food increased . . . . These devices also got in the way and prevented good cleaning of the trough. There tended to be hidden pockets and overlaps where old feed could collect and where bacterial, spoilage, flies, and so on could act on it . . ." (see column 1, lines 24 to 36).

The feeding device described in the Moore patent, however, is not entirely suitable for use as a horse feeder. In the first place, the device of Moore utilizes a feed saver ring unit 30 which is attached to Moore's feeding device and which comprises a circular ring of round metal wire covered with a plastic coating and spaced away from the sidewalls of Moore's device; the spaces between the sidewalls and the ring allow the feeding animal to throw feed up and out of the device, especially when the device is full of feed. In the second place, the feed saver ring is only supported by three anchoring devices (32, 33, and 34); because of this relatively flimsy construction, horses can readily chew on the ring wire, bend the ring wire, and so deform the feed saver ring that access to the feeding device is limited or precluded.

The Moore device has been marketed by the Carnation Company for many years. In its use, because the horses often chew on the ring wire and cut through or remove the plastic coating on the ring, the metal on the ring will often be exposed. Thus, when a horse is feeding on the Moore device, it will tend to ". . . feel a hot or cold metal ring"; and the exposed metal ". . . might tend to cut the horse or to frighten it" (see column 2 of the Moore patent, lines 58-63).

It is an object of this invention to provide a unitary feeding device which cannot readily be damaged by the feeding animal.

It is another object of this invention to provide a lightweight feeding device which weighs from about 1 to about 8 pounds.

It is another object of this invention to provide a feeding device with substantially inert nonmetallic surfaces which will not readily be subject to corrosion or pitting.

It is another object of this invention to provide a feeding device which may be approached by the animal from different directions and used in different positions.

It is another object of this invention to provide a feeding device which will not introduce contaminants into the feed.

It is yet another object of this invention to provide a feeding device which can readily be cleaned.

It is yet another object of this invention to provide a feeding device with a continuous flange around its top portion;

It is yet another object of this invention to provide a feeding device which can be mounted either in a corner or to a flat wall;

It is yet another object of this invention to provide a feeding device which may be manufactured in different colors.

SUMMARY OF THE INVENTION

In accordance with this invention, there is provided an integral feeding device consisting essentially of nonmetallic material. The feeding device of this invention contains at least four sections integrally joined to each other. The first section is a substantially arcuate bowl. The second section, which is integrally attached to the first section, contains an inwardly-extending wall. The third section, which is connected to the second, contains an outwardly-extending wall. The second and third sections define an integral convergent-divergent funnel. The fourth section is a sloping tray with a continuous, upwardly-extending flange.

BRIEF DESCRIPTION OF THE DRAWINGS

The preferred embodiments of the invention will be described in connection with the enclosed drawings, in which like numerals refer to like elements, wherein.

DESCRIPTION OF THE PREFERRED EMBODIMENTS

Figure 1:
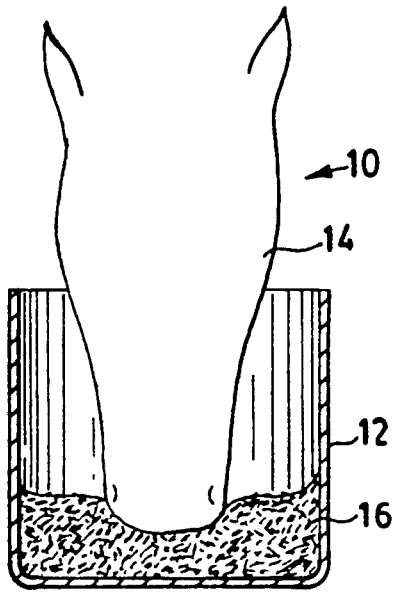
FIG. 1 is a sectional view of a horse feeding from a prior art feeding device.
Figure 2:
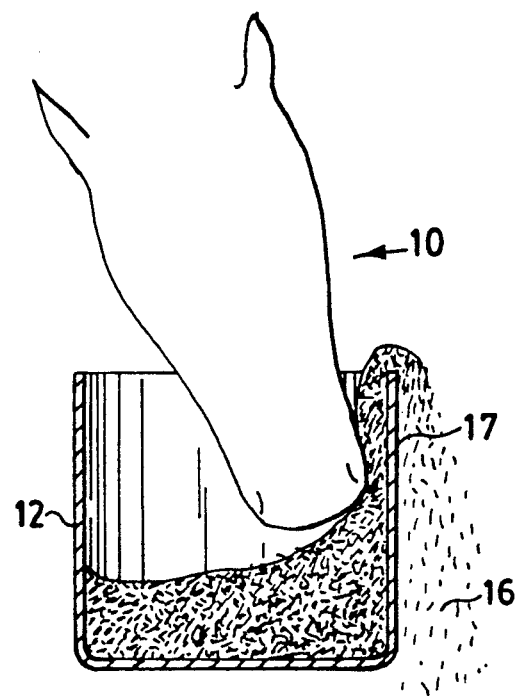
FIG. 2 is a sectional view of a horse spilling grain from a prior art sectional device.

Referring to FIG. 1, when a horse 10 ate grain from a prior art feeding device 12, no problem generally would occur as long as the horse's head 14 remained in a substantially vertical position. As illustrated in FIG. 2, however, when the horse moved his head from side to side, or forward, grain 16 would tend to be thrown over the side 17 of device 12.

Figure 3:
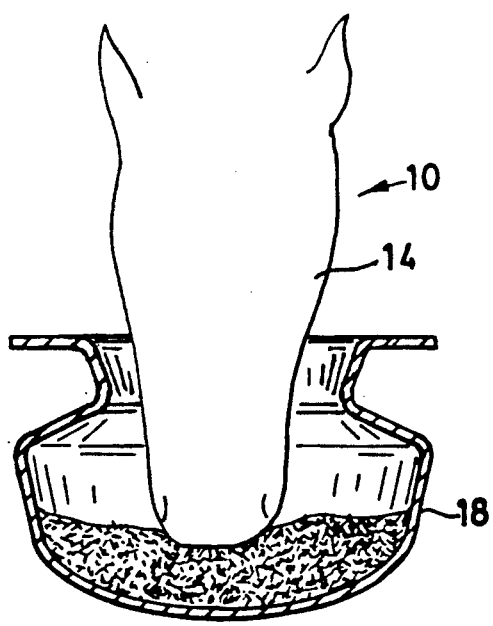
FIG. 3 is a sectional view of a horse feeding from a preferred embodiment of the device of the invention.
Figure 4:
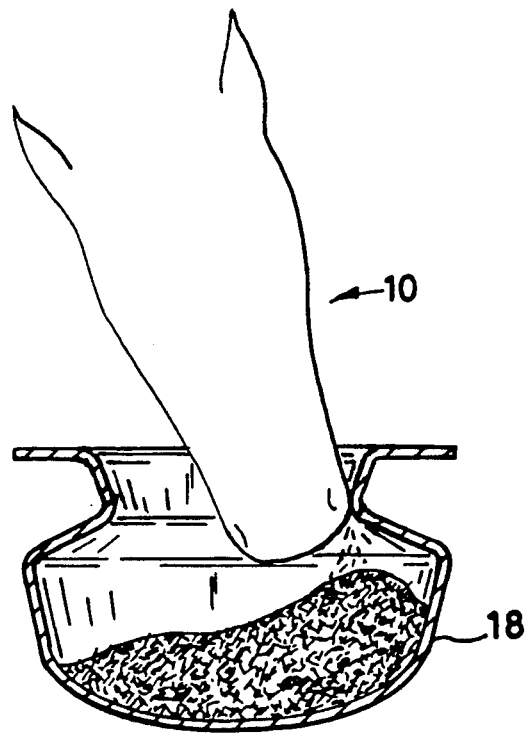
FIG. 4 is a sectional view of a horse attempting unsuccessfully to spill grain from the preferred embodiment of FIG. 3.

The use of applicant's device is illustrated in FIGS. 3 and 4. Again, when the horse's head 14 is substantially vertical, no problem with grain throwing or spilling generally occurs. However, even when the horse attempts to move his head to the side, or forward, the grain will be prevented from exiting feeder 18. As described hereinafter, the convergent-divergent funnel design of applicant's device tends to prevent loss of the feed material.

The feeding device 18 of this invention is substantially nonmetallic. The term substantially nonmetallic, as used in this specification, refers to a material at least 90 weight percent of which is comprised of one or more nonmetallic elements. It is preferred that at least about 95 weight percent of the feeding device comprise nonmetallic elements. It is more preferred that substantially 100 weight percent of the feeding device be comprised of nonmetallic elements.

As is known to those skilled in the art, a metal is an element that forms positive ions when its compounds are in solution and whose oxides form hydroxides rather than acids with water. See, e.g., page 748 of N. Irving Sax's "Hawley's Condensed Chemical Dictionary," Eleventh Edition (Van Nostrand Reinhold Company, New York, 1987), the disclosure of which is hereby incorporated by reference into this specification.

Any suitable nonmetallic material may be used to make feeding device 18. Thus, by way of illustration and not limitation, one may use Ceramic material, plastic material, thermoplastic material, elastomeric material, and the like. These materials are discussed in George S. Brady et al.'s "Materials Handbook," Twelfth Edition (McGraw-Hill Book Company, New York, 1986), the disclosure of which is hereby incorporated by reference into this specification.

In one preferred embodiment, at least 90 weight percent of feeding device 18 is comprised of plastic. The term plastic, as used in this specification, refers to a high-polymeric material, usually synthetic, which may be combined with other ingredients, such as curatives, fillers, reinforcing agents, colorants, plasticizers, and the like. See, e.g., pages 924-925 of said "Hawley's Condensed Chemical Dictionary."

It is preferred that feeder 18 consist essentially of a material selected from the group consisting of polyvinyl chloride, polyethylene, acrylonitrile-butadiene-styrene (ABS), fiberglass, polystyrene, polyesters, polyamides, and the like.

In one especially preferred embodiment, feeder 18 consists essentially of polyethylene. As is described on pages 633-636 of said "Materials Handbook" (the disclosure of which is incorporated by reference herein), the polyethylenes are a group of polyolefin polymers derived from ethylene by polymerization by heat and pressure; also see pages 935-936 of said dictionary. Polyethylenes are classified by density into low density materials (0.910 to 0.925), medium density materials (0.926 to 9.40), and high density materials (0.941 to 0.959). In one aspect of this embodiment, medium density material is used to prepare feeder 18.

In one preferred embodiment, the polyethylene material used is a medium density polyethylene, catalog number USI-MP- 6436-660, sold by the Quantum Chemical Division of USI Chemicals, Pittsburgh, Pa. This material is preferably formed into feeder 18 by conventional means such as injection molding, blow molding, and/or rotational molding, and the like.

In one embodiment, not shown, the polyethylene used in applicants' device is comprised of at least one additive which, under ambient conditions, emits negative ions.

The plastic material may be molded into feeder 18 by any of the molding means known to those skilled in the art. Thus, e.g., one may use the injection molding techniques described on pages 83 to 156 of Joel Frados' "Plastics Engineering Handbook of the Society of the Plastics Industry, Inc.," fourth edition (Van Nostrand Reinhold Company, New York, 1976), the disclosure of which is hereby incorporated by reference into this specification. Thus, e.g., one may use rotational molding techniques described on pages 348 to 357 of said Plastics Engineering Handbook.

Applicant's preferred feeder 18 is relatively lightweight, generally weighing less than about 8 pounds. In one embodiment, the feeder weighs from about 1 to about 8 pounds. In another embodiment, the feeder weighs from about 2 to about 6 pounds. In on preferred embodiment, the feeder weighs about 4 pounds.

Figure 8:
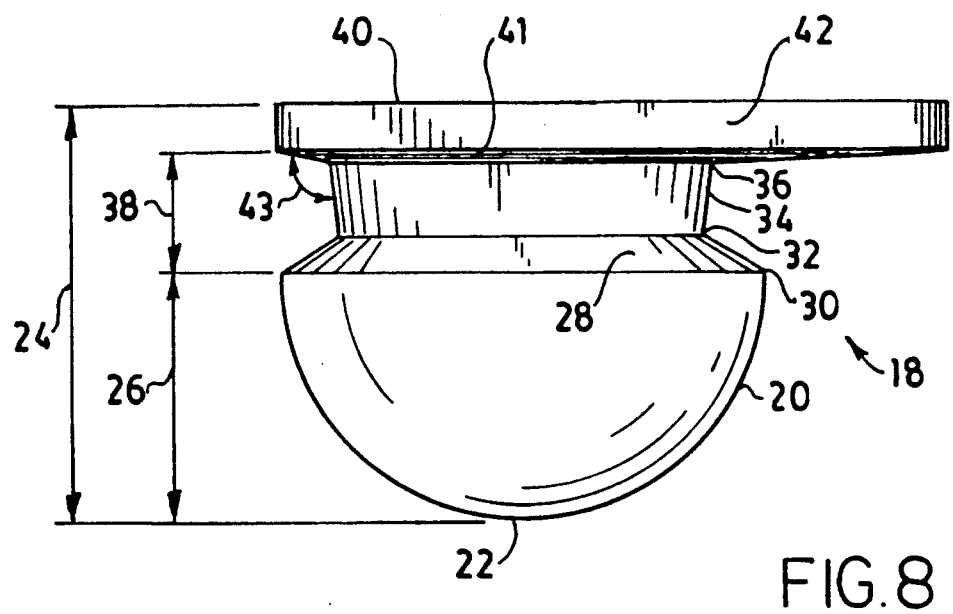
FIG. 8 is a back view of the embodiment of FIG. 3.

Feeder 18 preferably contains at least four sections integrally joined to each other. Referring to FIG. 8, the first section, section 20, is a substantially arcuate, bowl-shaped section.

As is known to those skilled in the art, a bowl is a rather deep, round dish or basin. The bowl-shaped section 20 may have an arcuate bottom; see FIG. 8, wherein bottom portion 22 is arcuate. Alternatively, bowl-shaped section 20 may have a portion 22 which is substantially flat. As long as section 22 defines a shape which is substantially round and has a wall which is arcuate, it is bowl-shaped within the meaning of this invention.

It is preferred that the depth 24 of feeder 18, as measured from the top to the bottom 22 of the feeder, be from about 6 to about 20 inches and, more preferably, from about 7 to about 10 inches. In this preferred embodiment, it is preferred that the depth 26 of portion 20 be from about 0.5 to about 0.9 times as great as depth 24.

Connected to portion 20 is a second section, inwardly-extending portion 28; it is preferred that section 28 be integrally connected to portion 20, although non-integral means of connection also may be used. Portion 28, like portion 20, preferably has a cross-section which is substantially round; however, because of the inwardly-extending nature of the walls of portion 28, the diameter of this portion is continuously varying depending upon the point at which it is measured, continually decreasing as one goes from point 30 to point 32 of portion 28.

Connected to portion 28 is outwardly-extending portion 34; it is preferred that portion 34 be integrally connected to portion 28, although non-integral means of connection also may be used. Portion 34, like portions 20 and 28, has a cross-section which is substantially round; however, because of the outwardly-extending nature of the walls of portion 34, the diameter of this portion is continuously varying depending upon the point at which it is measured, continually increasing as one goes from point 32 to point 36 of portion 34.

In combination, the connected portions 28 and 34 form a convergent-divergent funnel. The depth 38 of this convergent-divergent funnel is from about 0.2 to about 0.3 times the depth 24 of feeder 18.

The use of the convergent-divergent funnel structure in applicant's feeder 18 is critical, for it prevents an animal, such as a horse or a cow or a sheep, when making a sweeping motion with its head from side to side or front to back, from pushing feed material from arcuate portion 20 out of feeder 18.

Connected to portion 34 is feed tray 40 which is preferably integrally connected to portion 34. In one embodiment, not shown, feed tray 40 is connected to portion 34 by non-integral means such as, threaded fasteners; in this embodiment, feed tray 40 is removably attached to portion 34. By the same token, portion 34 may be removably attached to portion 28, and/or portion 28 may be removably attached to portion 20.

Referring to FIG. 8, it will be seen that tray 40 is preferably comprised of a sloping bottom surface 41 which is connected to portion 34. The angle 43 formed between bottom surface 41 and portion 34 preferably is obtuse, always exceeding 90 degrees. In one embodiment, not shown, angle 43 is substantially 90 degrees.

Figures 6, 7:
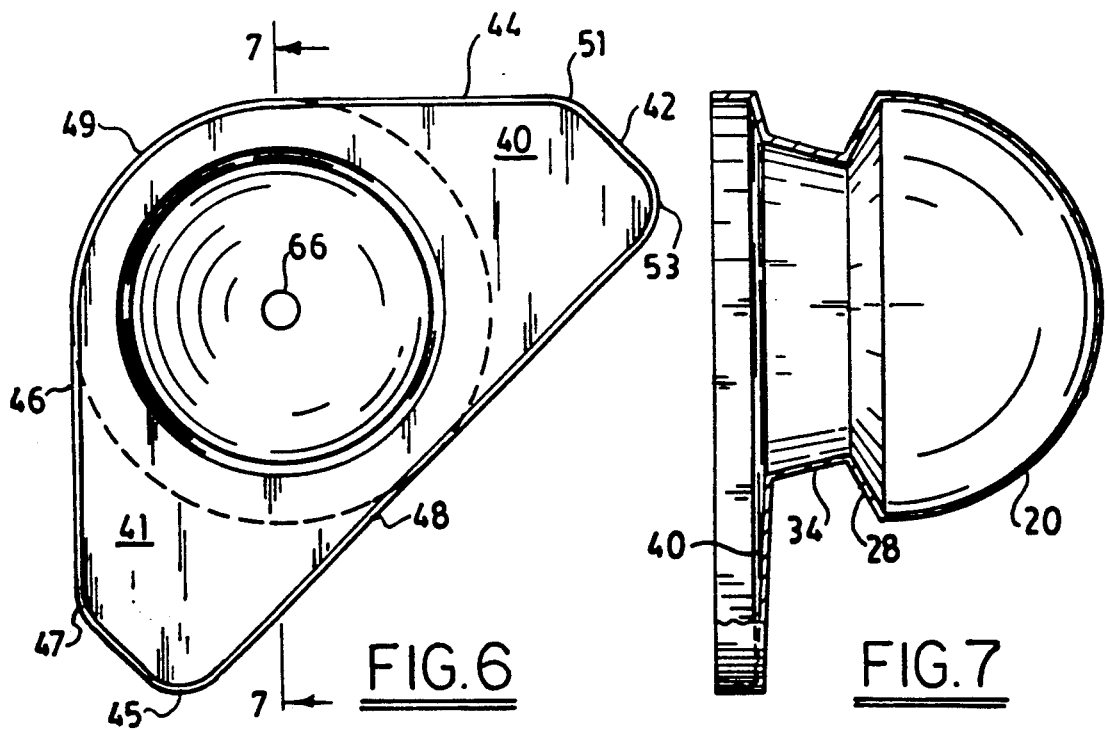
FIG. 6 is a top view of the embodiment of FIG. 3.
FIG. 7 is a side view of the embodiment of FIG. 3.

Referring to FIG. 6, it will be seen that tray 40 is preferably comprised of an upwardly-extending lip 42 which is continuous; said flange 42 extends around the entire perimeter of the feed tray.

Figure 5:
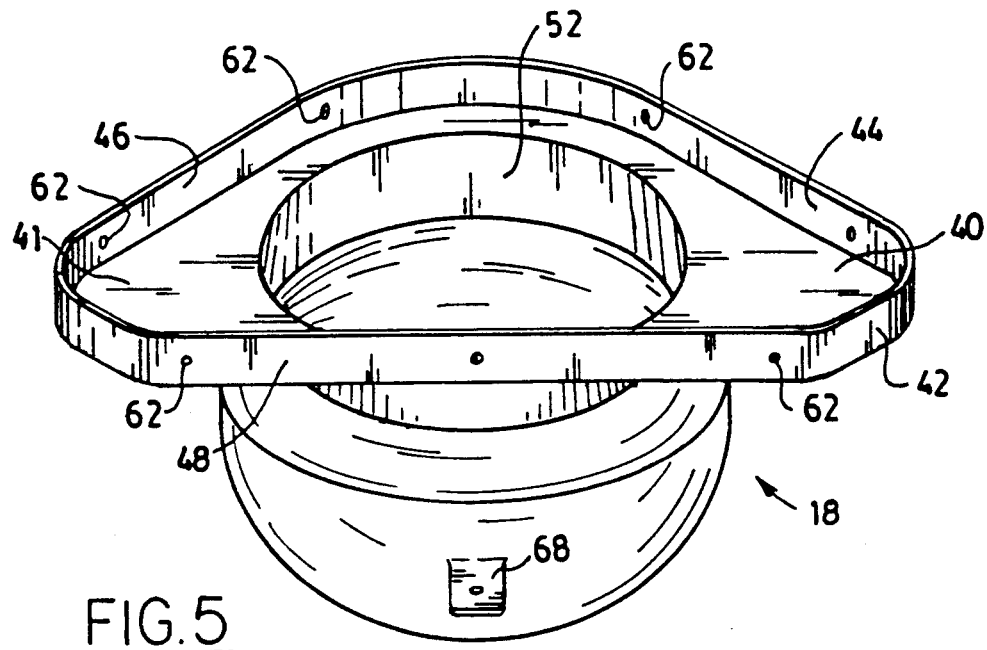
FIG. 5 is a perspective view of the embodiment of FIG. 3.

Feed tray 40 preferably has at least three-sides, such as sides 44, 46, and 48 (see FIG. 5). Each of sides 44, 46, and 48 is comprised of means for attaching said side to a mounting surface; see, e.g., orifices 62 shown in FIG. 5. As will be apparent to those skilled in the art, one may insert various conventional fasteners through one or more of orifices 62. In one embodiment, not shown, side 48 is attached to a flat wall. In another embodiment, not shown, sides 44 and 46 are used to mount feeder 18 in a corner. Other means of mounting feeder 18 will be apparent to those skilled in the art.

In the embodiment illustrated in FIG. 5, sides 44, 46, and 48 form a continuous flange 42. In another embodiment, not shown, one or more of sides 44, 46 and/or 48 are not connected to one or more of the other such side(s).

In the preferred embodiment illustrated in FIG. 5, wherein continuous flange 42 is shown, flange 42 defines a substantially triangular shape which does not contain any sharp surfaces which might injure an animal during feeding. Thus, each of sides 44, 46, and 48 are joined to one another by arcuate surfaces 45 and/or 47 and/or 49 and/or 51 and/or 53 (see FIG. 6).

In one preferred embodiment, illustrated in FIG. 6, sides 44, 46, and 48 define a substantially isosceles triangle with sides 44 and 46 substantially at right angles to each other and all sides connected by large, sweeping radii. In this embodiment, because of the shape of tray 40, feeder 18 is suitable for corner mounting or, alternatively, flat-wall mounting by simply rotating the feeder to position the long, flat side 48 against the flat wall.

In one preferred embodiment, feed tray 40 extends upwardly from the round center opening 52 (at which point feed tray 40 is joined to portion 34) to the base of sides 44, 46 and 48. In this embodiment, because center opening 52 is defined by arcuate surfaces, each and every interior surface of feeder 18 is both smooth and rounded. Thus, there are no sharp edges or rough surfaces which will injure or irritate the animal. These rounded and smooth surfaces provide an easily cleaned interior surface and, furthermore, facilitate the flow of loose feed towards the bottom of the bowl. By comparison, the flanges gg of U.S. Pat. No. 150,423 of Link define non-arcuate sharp surfaces which present a substantial hazard to a feeding animal.

In one preferred embodiment, feed tray 40 is comprised of a multiplicity of mounting holes 62. In the embodiment shown in FIG. 5, all of these mounting holes appear in sides 44, 46, and 48. In another embodiment, not shown, some of these mounting holes appear in the bottom tray surface 64 of tray 40.

In one preferred embodiment, illustrated in FIG. 5, feeder 18 is comprised of a means 68 for mounting said feeder to a wall (not shown). It is preferred that mounting means 68 be integrally connected to bowl 20.

In one preferred embodiment, illustrated in FIG. 6, feeding device 18 is provided with a clean-out port 66 in the bottom of bowl 20.

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

We claim:

1. A feeding device which weighs less than about 8 pounds, wherein said device is comprised of at least a first bottom section, a second intermediate section, a third intermediate section, and a fourth top section, and wherein:

(a) said first bottom section, said second intermediate section, said third intermediate section, and said fourth top section are integrally joined to each other and define a receptacle with a plurality of interior surfaces, wherein each of said interior surfaces is both smooth and rounded;

(b) the depth of said feeding device is from about 6 to about 20 inches;

(c) said first bottom section has a substantially circular cross-section and is substantially bowl-shaped, extending to its maximum diameter at the point where said first bottom section is integrally joined to said second intermediate section, and the depth of said first bottom section is from about 0.5 to about 0.9 times as great as the depth of said feeding device;

(d) said second intermediate section has a substantially circular cross-section, and the walls of said second section extend inwardly from the bottom of said section to its top;

(e) said third intermediate section has a substantially circular cross-section, and the walls of said third section extend outwardly from the bottom of said section to its top;

(f) said second and said third intermediate sections define, in combination, a convergent/divergent funnel; and (g) said fourth top section is comprised of a tray which comprises a flange continuously extending around the perimeter of said tray, wherein:

1. said flange is comprised of a first substantially linear side, a second substantially linear side, a third substantially linear side, and a fourth substantially arcuate side, 2. said first substantially linear side has a length which is greater than the length of said second substantially linear side and the length of said third substantially linear side, and 3. said first substantially linear side is coplanar with a portion of said first bottom section.

2. The feeding device as recited in claim 1, wherein said feeding device is comprised of at least 90 weight percent of nonmetallic material.

3. The feeding device as recited in claim 2, wherein said feeding device is comprised of means for mounting said first side to a wall, means for mounting said second side to a wall, and means for mounting said third side to a wall.

4. The feeding device as recited in claim 1, wherein said device consists essentially of polyethylene.

5. The feeding device as recited in claim 4, wherein said polyethylene is comprised of material which, at ambient temperature, emits negative ions.

6. The feeding device as recited in claim 2, wherein said tray is comprised of a sloping bottom surface.

7. The feeding device as recited in claim 6, wherein said flange is substantially in the shape of an isosceles triangle.

8. The feeding device as recited in claim 2, wherein said first side and said second side of said tray are substantially at right angles to each other.

9. The feeding device as recited in claim 1, wherein said feeding device is comprised of a means attached to said first section for mounting said feeding device to a wall.

10. The feeding device as recited in claim 3, wherein said first side and said second side of said tray are substantially at right angles to each other.

11. The feeding device as recited in claim 10, wherein each of said first side, said second side, and said third side are connected to each other by arcuate surfaces.

* * * * *